INVENTOR.
BY Emil V. Block
M. B. Tasker
ATTORNEY

INVENTOR.
BY Emil V. Block
M. B. Parker
ATTORNEY

June 28, 1949.                     E. V. BLOCK                     2,474,652
                    BENDING FRAMES PIVOTALLY CONNECTED
                         BY STRETCH PRODUCING HINGES
Filed Feb. 18, 1948                                       5 Sheets-Sheet 4

INVENTOR.
BY Emil V. Block
M. B. Tasker
ATTORNEY

Patented June 28, 1949

2,474,652

UNITED STATES PATENT OFFICE 2,474,652

BENDING FRAMES PIVOTALLY CONNECTED BY STRETCH PRODUCING HINGES

Emil V. Block, Stratford, Conn., assignor to United Aircraft Corporation, East Hartford, Conn., a corporation of Delaware Application February 18, 1948, Serial No. 9,140

5 Claims. (Cl. 153—33)

This invention relates to improvements in bending jigs and more specifically to jigs for bending and fabricating composite laminated structures of metal and wood.

It is a principal object of this invention to provide an improved type of jig for bending a laminated panel into a shape having a sharply bent portion and in which the panel is firmly held in the jig frame which changes its dimensions and shape during bending of the panel.

Another object of this invention is to provide an improved type of jig for bending laminated structures having relatively sharp radii of curvature, and more specifically to provide a bending jig having improved panel holding and positioning means for maintaining the material of the laminated structure adjacent the bend axis under compression during bending.

It is a further object of this invention to provide an improved bending jig of this type having improved hinge means for relieving the concentration of stresses due to bending.

It is a further object of this invention to provide a bending jig so constructed that sharp yet smooth bends can be made in composite laminated structures without rupturing or wrinkling of the structure or any of its elements.

These and other objects of the invention will become apparent from the following detailed description of the accompanying drawings. In these drawings, wherein similar reference characters refer to similar parts throughout the views, Fig. 1 is a perspective view of a bending jig constructed according to this invention showing the jig in open position;

Figure 1:
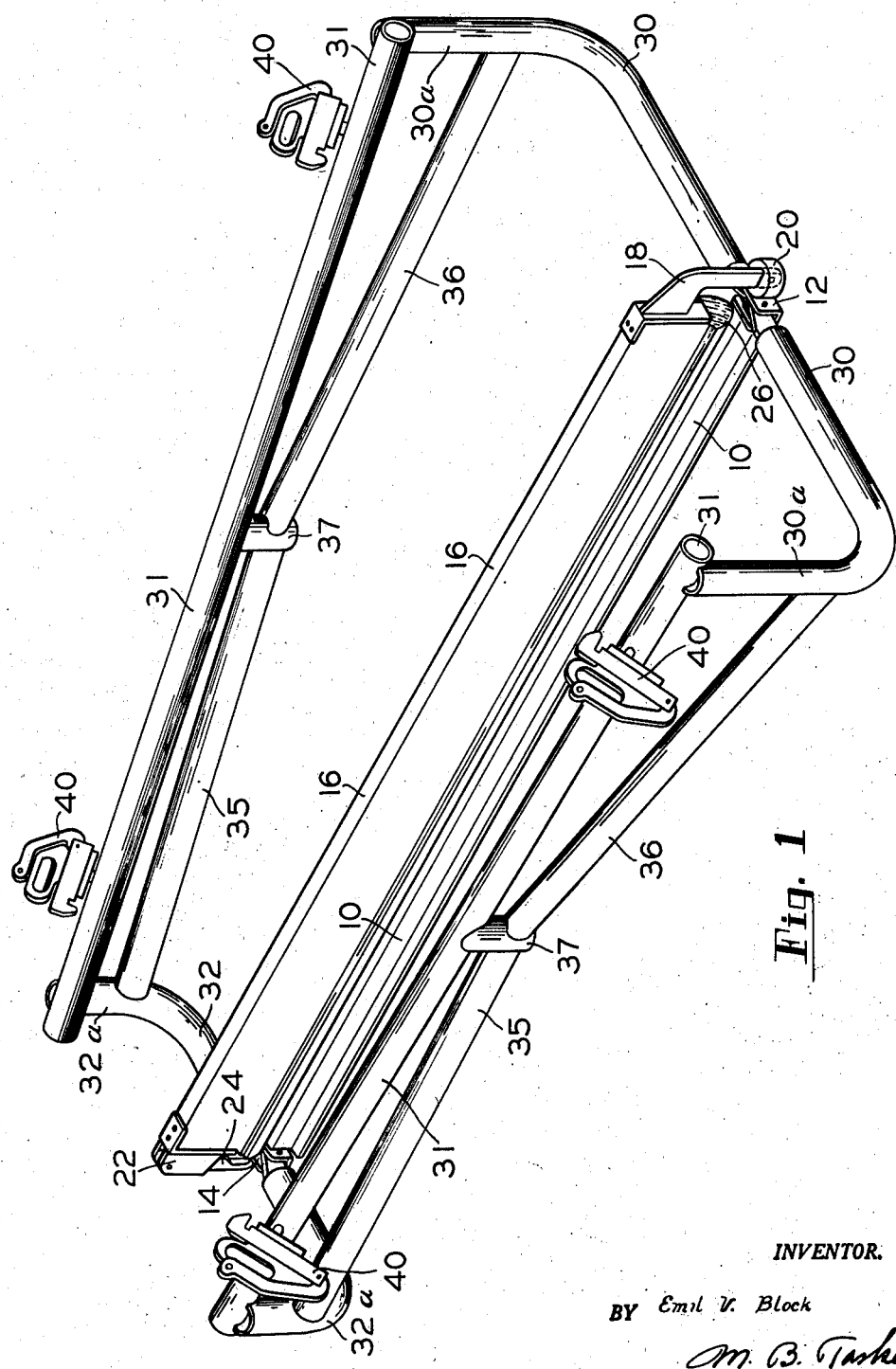

Referring to Fig. 1, this bending jig is constructed with a longitudinal base comprising a hat section channel 10 which has U-shaped hinge housings 12 and 14 attached thereto at its front and rear extremities respectively. A central retaining member 16 for holding laminated structures in position in the jig is pivotally connected parallel to and above the base 10 by means of the elbow 18 having a pivot connection to the member 20 which in turn is welded to the outer surface of the hinge housing 12. The other extremity of the member 16 has attached thereto a bifurcated bracket 22 which carries the latch 24 for engagement with a latch plate on the outer surface of the hinge housing 14. The lower surface 26 of the retaining member 16 is shaped to give the proper contour of the structure being bent in the vicinity of the bend axis. Extending from the hinge housing 12 and pivotally attached to the hinge mechanism within the housing are two tubular arms 30 which extend laterally and have their ends 30a bent upwardly at right angles. The upper ends 30a of the arms 30 are welded to identical tubes 31 which extend longitudinally the full length of the jig. Similar but shorter arms 32 are provided at the rear end of the jig having upper ends 32a welded to the rear ends of tubes 31. Arms 32 are similar to the large arms 30 in that they are of the same relative shape and are pivotally connected within the hinge housing 14 in the same manner as the arms 30.

Welded bars 35 and 36 on each side of the jig connect arms 30 and 32, respectively, to the butts 37 which in turn are welded to the longitudinal tubes 31 intermediate the ends of the latter. Each of the tubes 31 carries two or more clamp fixtures 40 which are used for securing the lateral edges of laminated panels to the jig frame.

Figure 2:
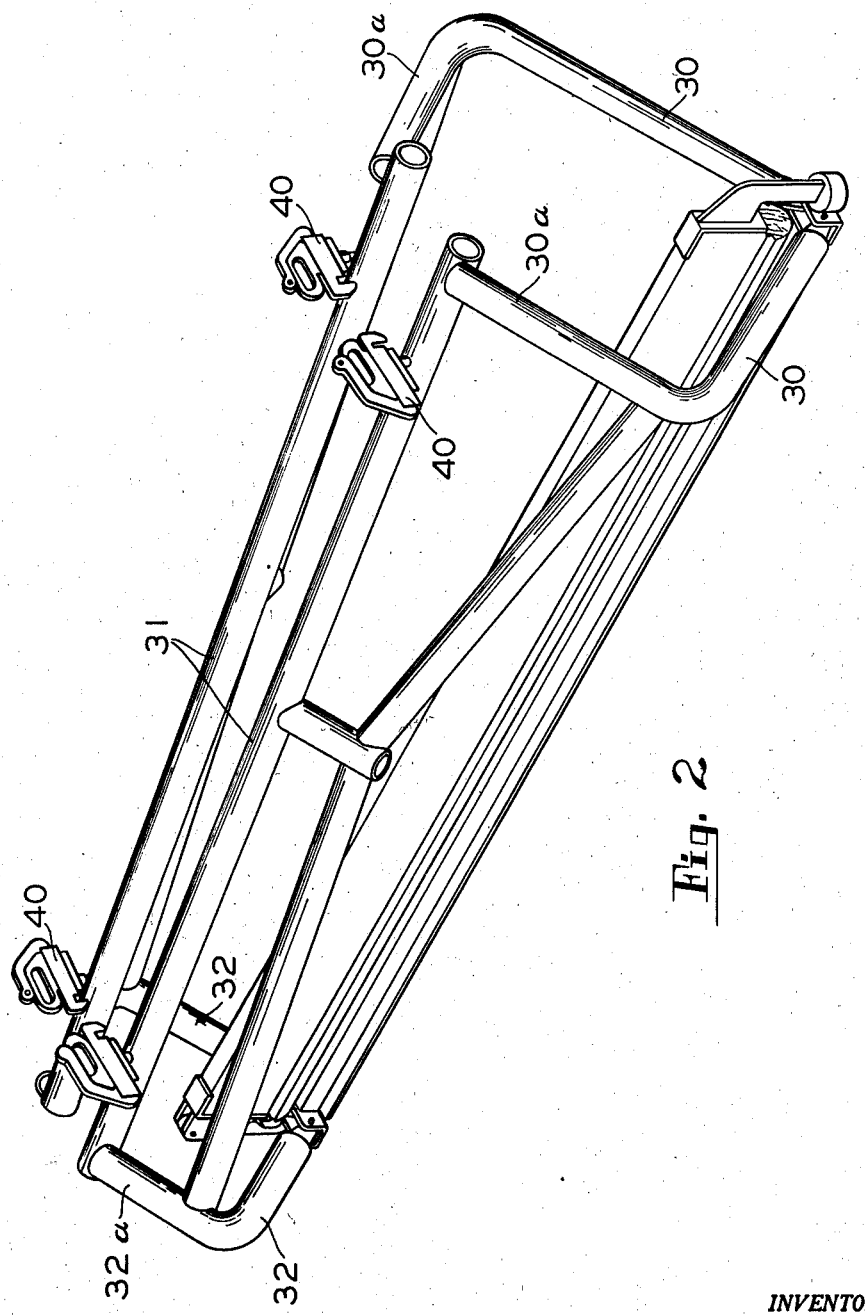
Fig. 2 is a perspective view of the jig of Fig. 1 in the closed position.

It is apparent that since the jig arms 30 are larger than the arms 32 the entire frame has a tapered configuration. This can more easily be seen by referring to Fig. 2 which shows the jig frame in the closed position. In this figure, since the arms 30 are longer than the arms 32, the longitudinal tubes 31 will have a downward slope away from their attaching point on the ends 30a of arms 30.

Figure 3:
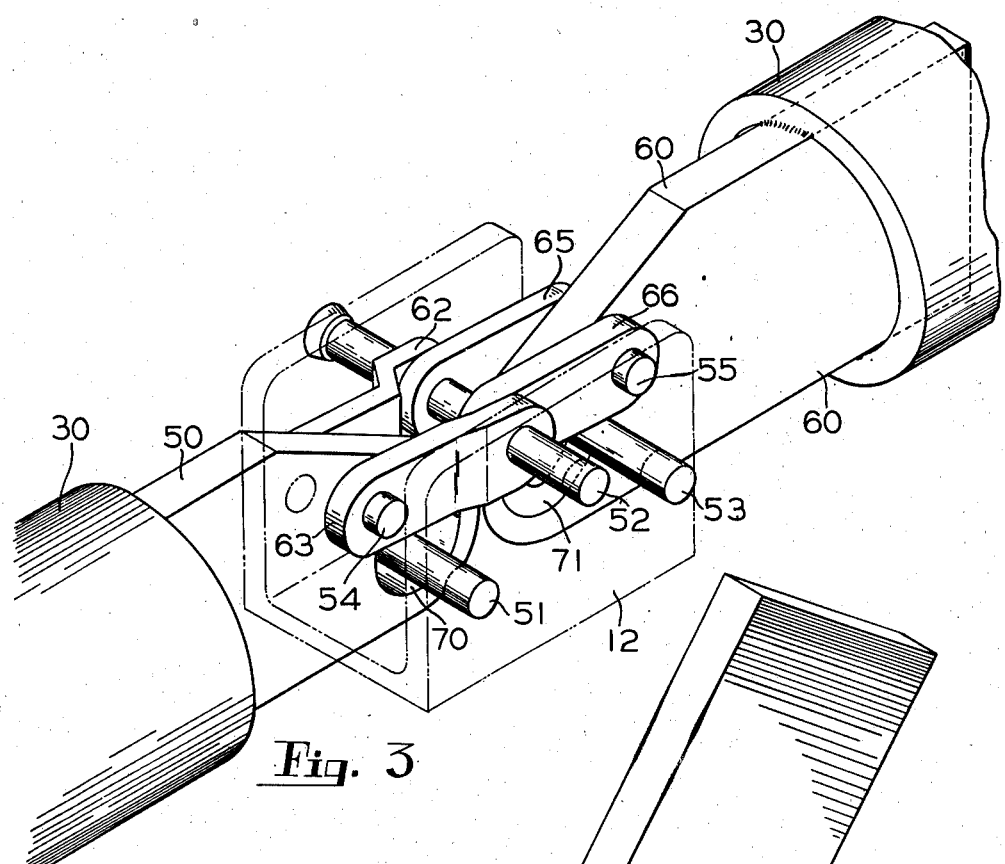
Fig. 3 is an enlarged perspective view of the front hinge mechanism with the jig arms in the open position, the hinge housing being shown in phantom.
Figure 4:
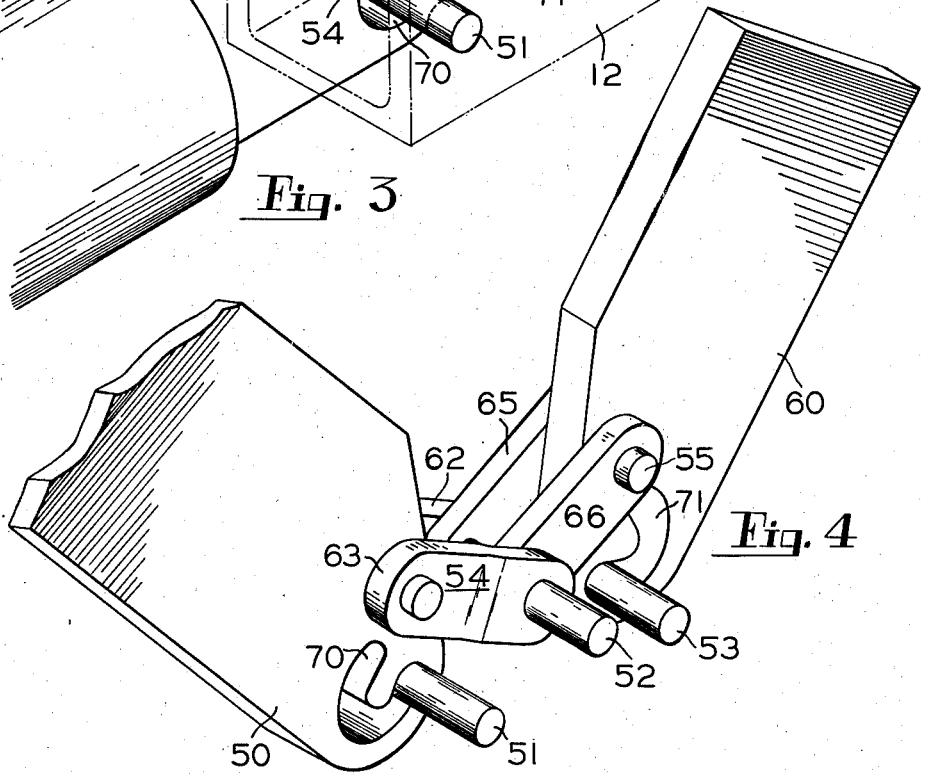
Fig. 4 is a perspective view of the hinge of Fig. 3, showing the position of the hinge elements when the jig arms are in the closed position.

Referring to Figs. 3 and 4, the arms 30, heretofore described as the larger arms, have welded thereto the hinge attaching plates 50 and 60. Plates 50 and 60 have curved slots 70 and 71, respectively, which receive the pivot pins 51 and 53 which are rigidly mounted in the uprights of the hinge housing 12. The attaching plate 50 also carries a free pivot pin 54 for pivotally supporting one end of the toggle links 62 and 63 which are disposed on opposite sides of plate 50. It is necessary for the toggle links 62 and 63 to be joggled so that the straight toggle links 65 and 66, which are mounted on the free pivot pin 55 of plate 60, can be rotatably mounted on the pivot pin 52 common to both sets of toggle links 62, 63 and 65, 66. The pivot pin 52, like the pins 51 and 53, is rigidly mounted on the hinge housing 12.

Figure 5:
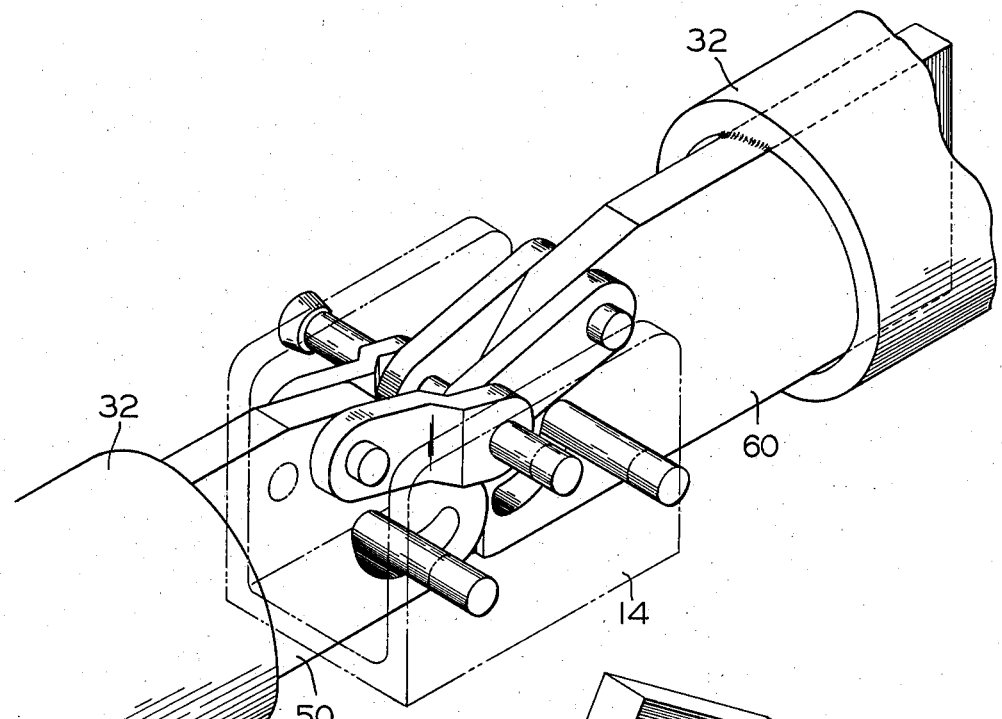
Figs. 5 and 6 are views similar to Figs. 3 and 4, respectively, showing the hinge employed in the rear end of the tapered jig.
Figure 6:
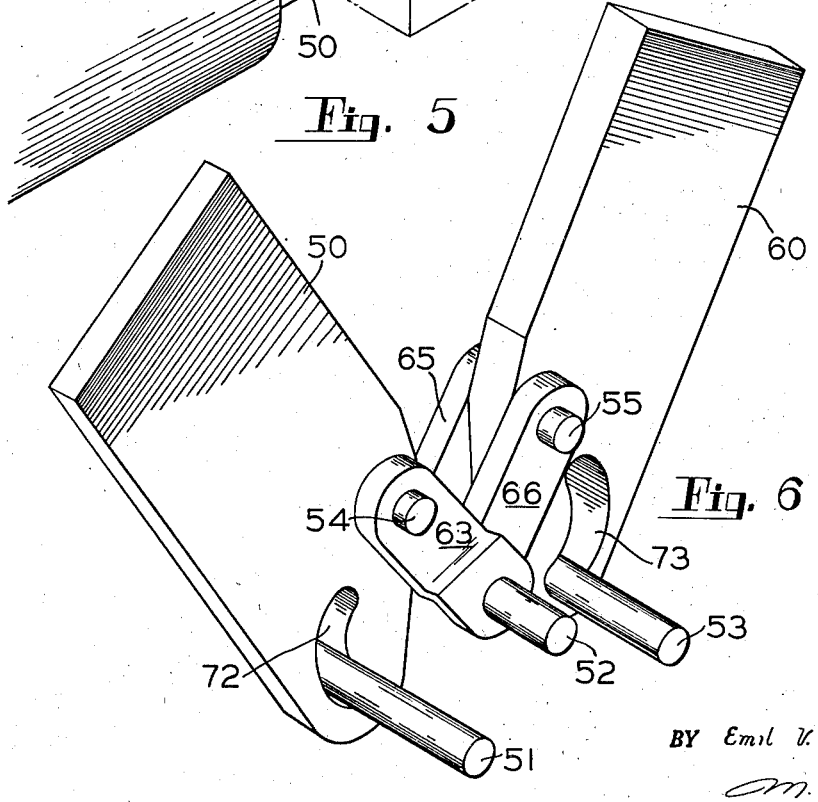
Figure 7:
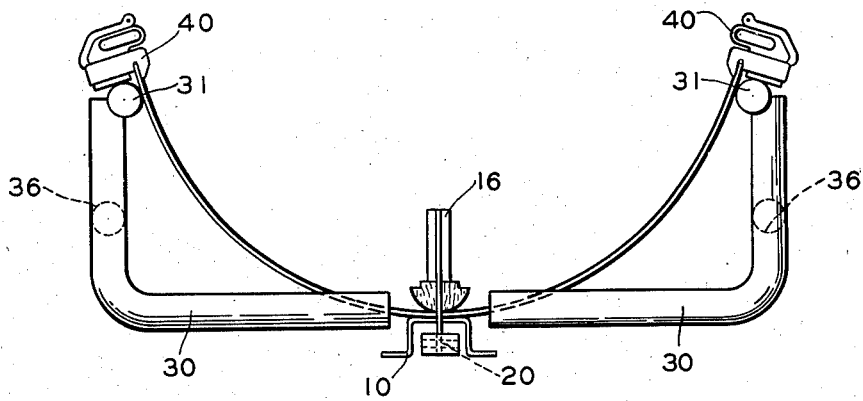
Fig. 7 is an end view of the bending jig showing the bending frame and the panel in position.
Figure 8:
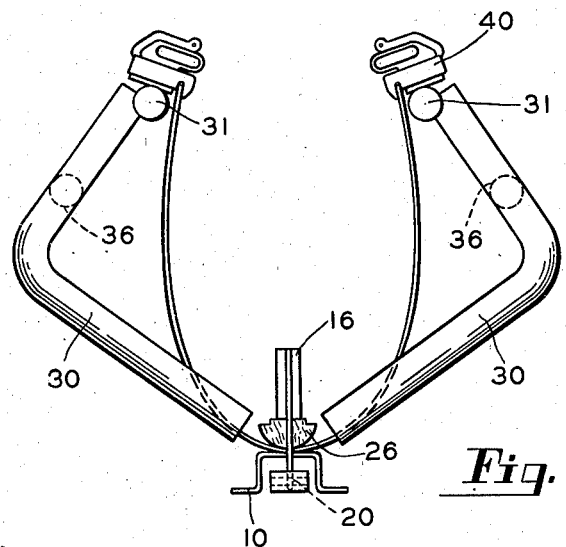
Fig. 8 is the same as Fig. 7, except that the bending frame has been folded.
Figure 9:
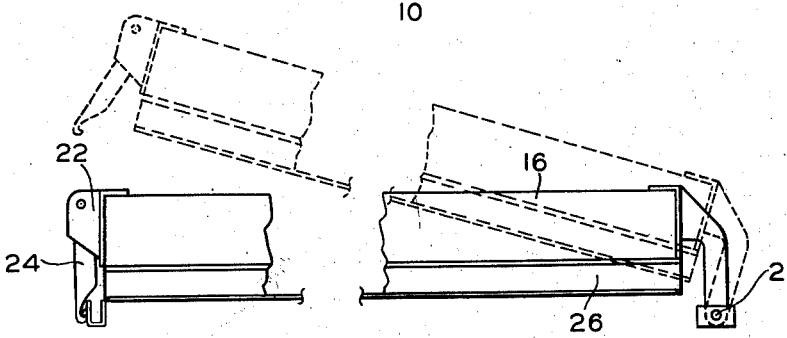
Fig. 9 is a longitudinal view of the retaining member showing the retaining member and the latch mechanism.

The rear hinge mechanism which mounts the smaller arms 32 of the jig frame is almost identical to the forward hinge mechanism. As can be seen in Figs. 5 and 6, the major difference lies in the arrangement and degree of curvature of the slots 70, 71 in the front hinge and slots 72, 73 in the rear hinge. Other than this feature, the two hinges are practically identical.

According to this invention, when it is desired to bend a laminated panel, the panel is placed relatively flat or partially curved in the opened jig shown in Fig. 1. The edges of the panel so inserted are clamped firmly by the fixtures 40 to the frame members 31 of the jig. The retaining member 16 is then placed over the top center of the panel and locked in place by the latch 24 to maintain a force perpendicular to the face of the panel at the bend. By raising the longitudinal tubes 31 and the arms 30, 32 by a suitable jacking mechanism, the panel edges will be drawn upwardly and toward the center to form the desired airfoil shape. During this bending process it should be noted that by reason of the fact that the opposite edges of the panel are held by clamps 40 and the bottom surface of the panel is supported by the jig, the material of the panel immediately adjacent the bend axis is kept under compression and at the same time the lower surface 26 of the retaining member 16 acts as a die to give the proper contour to the bend as the sides move upward and their pivot centers move out laterally and up under the influence of the double acting hinge mechanisms. This pivotal displacement of the arms is controlled by the pins 51 and 53 sliding within the cam slots 70 and 71 in the front hinge plates, and the corresponding slots 72 and 73 in the rear hinge plates. For example, as the attaching plates 50 move from the Fig. 3 position to the Fig. 4 position, an effect is obtained of wrapping the panel around the lower surface 26 of the retaining member 16. In other words, the movement of the front and rear arms 30, 32 during bending is governed by the links 63, 66 pivoting about fixed pin 52 as controlled by cam slots 70, 71 and 72, 73 acting on fixed pins 51, 53 therein. This composite movement of the pivoted ends of arms 30, 32 results in gradually extending the distance between pin 52 and the edges of the panel held by clamps 40 as bending proceeds. This extension is necessary in order to maintain the material on the inner radius of bend of the laminated structure along the bend axis in compression against retaining member 16 to obtain a smooth bend.

After the desired bend has been made, ties of predetermined length are attached to the upper, or free ends, of the bent panel prior to removal from the jig. It is the practice to then place the laminated structure in a mold for final curing under proper temperature and pressure. The complete method of assembling and shaping laminated panels of wood and metal into airfoil shape is disclosed and claimed in a copending application Serial No. 20,126, filed April 9, 1948 and assigned to the assignee of this application.

As a result of this invention, it is possible to fabricate sharply bent laminated structures such as tapered wing or tail surfaces for airplanes without damage to the laminations while obtaining perfectly smooth exterior surfaces.

It is further made possible to eliminate damage to the inner laminations at the bend by cracking or splitting as the panel is given its final bend, the material at the bend being kept under compression by reason of the improved jig above described.

While only one embodiment of the invention has been shown and described, it will be evident that various changes in the construction and arrangement of the parts may be made without departing from the scope of the appended claims.

I claim:

1. In a jig for forming tapered airfoil structures from laminated sheet material having relatively sharp radii of bend, a longitudinal base, two tapered frames having double acting hinges connecting said frames to the base at each end of said base for displacing the pivotal centers at each end of said frames at different rates, means for securing the laminated material in said jig to said base along the bend axis, and means for maintaining the material of the sheet in the bend area under compression during bending including clamps for securing the longitudinal edges of said sheet to said frames.

2. A jig for bending composite laminated panels into airfoils, a longitudinal base, two frames pivotally mounted thereon having a bi-planar taper along said base, supports at each end of the longitudinal base, double acting hinges for connecting said frames to said supports comprising links connecting said frames directly and having common pivotal connections to said supports, and said frames having pivotal connections with said supports spaced from the connections of said links therewith.

3. In a jig for bending laminated panels into tapered airfoil shapes having sharp radii of curvature, a longitudinal base, hinge supports attached to said base, a longitudinal retaining member for securing the panels to the base along the bend axis, two frames tapered in two planes each mounted to hinge mechanisms within said hinge housings by means of attaching plates containing curved slots, said slots having less curvature in the mounting plates at the smaller end of said frames and each of said slots engaging stationary pivot pins in said hinge supports.

4. In a jig for bending panels into airfoil shapes, a longitudinal base, hinge supports attached to said base, a longitudinal retaining member for securing the panels to the base along the bend axis, two frames pivotally mounted on hinge mechanisms within said supports by means of attaching plates, clamps mounted on said frames for firmly securing a panel to said frames, each hinge mechanism including a pivot pin fixed in said support, links pivotally connecting said pin to said frames, and pivot pins fixed in said support and slidably mounted in cam slots in said plates, said cooperating cam slots and pins controlling the distance between said clamps and said first-mentioned pin as said frames are moved toward each other about said first-mentioned pivot pin to bend a panel in said jig.

5. In a hinge mechanism, a hinge support, two hinge plates, a pivot pin fixed to said support, links pivotally supported on said pin at their adjacent ends and pivotally connected with said plates at their remote ends, said plates having cam slots, and pivot pins passing through said slots and also fixed to said support, said slots having cam surfaces cooperating with said pins for moving said plates upwardly and outwardly when said plates are moved toward each other.

EMIL V. BLOCK.

REFERENCES CITED

The following references are of record in the file of this patent:

UNITED STATES PATENTS

| Number | Name | Date |
|---|---|---|
| 375,792 | Bailey | Jan. 3, 1888 |
| 818,932 | Baxter | Apr. 24, 1906 |
| 961,332 | Addicks | June 14, 1910 |
| 1,200,477 | Frantz | Oct. 10, 1916 |
| 1,440,982 | Graham | Jan. 2, 1923 |
| 1,461,471 | Bancroft | July 10, 1923 |
| 1,906,392 | McLeod | May 2, 1933 |
| 2,100,928 | Way | Nov. 30, 1937 |
| 2,178,271 | Soss | Oct. 31, 1939 |
| 2,206,708 | Stumpf | July 2, 1940 |
| 2,246,358 | Jelinek | June 17, 1941 |
| 2,382,807 | Nobles | Aug. 14, 1945 |
| 2,442,268 | Fields | May 25, 1948 |

FOREIGN PATENTS

| Number | Country | Date |
|---|---|---|
| 10,668 | Great Britain | May 9, 1902 |
| 482,769 | Great Britain | Apr. 5, 1938 |
| 543,040 | Great Britain | Feb. 6, 1942 |